R. A. B. WALSH.
METHOD AND APPARATUS FOR MAKING WIRE GLASS.
APPLICATION FILED DEC. 2, 1907.
940,843.
Patented Nov. 23, 1909.
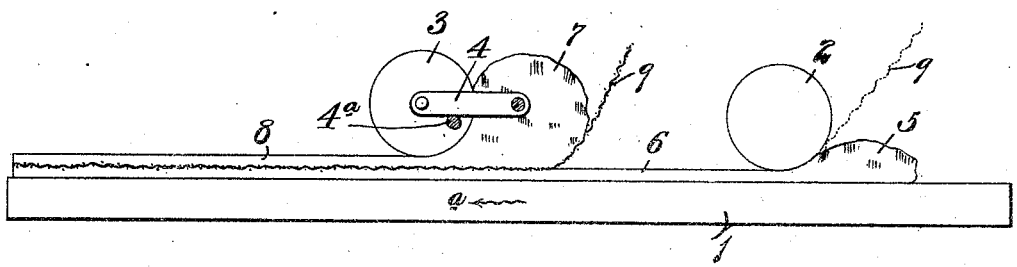
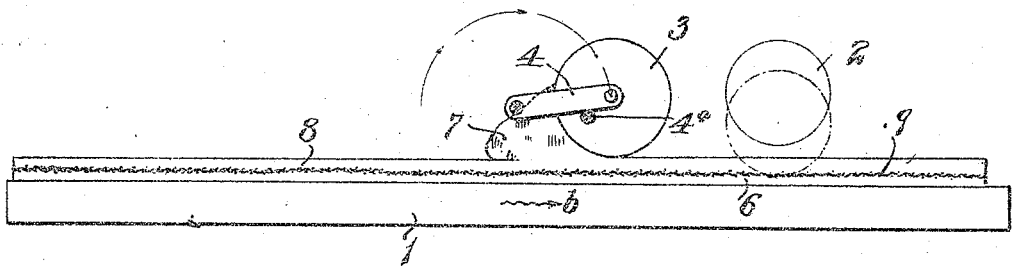

UNITED STATES PATENT OFFICE.

ROBERT A. B. WALSH, OF ST. LOUIS, MISSOURI.

METHOD AND APPARATUS FOR MAKING WIRE-GLASS.

940,843.

Specification of Letters Patent.

Patented Nov. 23, 1909.

Application filed December 2, 1907. Serial No. 404,851.

*To all whom it may concern:*

Be it known that I, ROBERT A. B. WALSH, a citizen of the United States, residing at St. Louis, Missouri, have invented a certain new and useful Improvement in Methods and Apparatus for Making Wire-Glass, of which the following is a full, clear, and exact description, such as will enable others skilled in the art to which it appertains to make and use the same, reference being had to the accompanying drawings, forming part of this specification, in which—

Figure 1 is a side elevation of an apparatus for practicing my method; and Fig. 2 is a view similar to Fig. 1 but showing parts of said apparatus in a different position.

This invention relates to the manufacture of wire glass.

The object of my invention is to provide a novel method of making a sheet of wire glass by means of an apparatus described in my pending application serially numbered 404,852 and filed Dec. 2, 1907.

Briefly described, my method consists in forming a sheet of wire glass from three separate layers of glass with a piece of wire mesh arranged between the bottom layer and the second layer, said layers being welded together while they are in a heated condition so as to produce a single sheet. Preferably, the first layer or bottom layer is formed from one mass of molten glass and the second and third layers are formed from a separate mass of molten glass, the wire mesh being covered by the second layer simultaneously with the operation of forming said layer. Instead of forming the second and third layers from a single batch or mass of glass I can use a separate batch of glass to form each of said layers so that I do not wish it to be understood that my method is limited to the idea of forming the second and third layers from a single mass of glass.

Referring to the drawings which illustrate one form of apparatus for practicing my method, 1 designates a table above which a smooth-surface roller 2 is arranged, said roller being adapted to be raised or elevated for a purpose hereinafter described. A smooth-surface roller 3 is also arranged above the table and this roller in addition to being adjustable is so constructed that it can be shifted from one position into another, the roller being herein shown as carried by pivotally mounted arms 4.

To form a sheet of wire glass with an apparatus of this description I first dump a batch or mass 5 of molten glass onto the table and then move the table in the direction of the arrow *a* in Fig. 1, the roller 2 spreading the mass of glass 5 over the table to form a bottom layer 6. When the end of this layer 6 has arrived at a point adjacent the roller 3 a second mass 7 of molten glass is dumped onto said layer so that the roller 3 will spread a portion of said mass over the bottom layer to form a second layer 8. The end of a piece of wire mesh 9 is placed on the bottom layer 6 prior to the operation of dumping the mass of glass 7 onto said layer so that said mesh will be covered by the second layer 8 at the same time said layer is being formed. After the first and second layers have been formed, the roller 2 is elevated, as shown in full lines in Fig. 2, and the wire mesh is severed. The roller 3 is then swung over onto the opposite side of the mass of molten glass 7, a stop 4ᵃ contacting with one of the arms 4 to determine the position of said roller, and the table 1 is then moved in the opposite direction, as indicated by the arrow *b* in Fig. 2, so that the remaining portion of the mass 7 of glass will be spread over the second layer to form a thin third layer or finishing layer. As the wire mesh is completely covered by the glass which forms the second layer said mesh will not oxidize as it is not exposed to the air after it has become heated from contact with the molten glass so that said mesh will look bright and new after it has been embedded in the glass. The wire mesh has a tendency to contract and draw the glass in which it is embedded and this produces an irregular or uneven surface on the second layer but this uneven surface is covered by the third layer or finishing layer so that the finished product has smooth and brilliant surfaces.

If desired, the end of the wire mesh can be placed underneath the roller 2, as shown in dotted lines in Fig. 1, prior to the operation of dumping the mass of glass 5 onto the table so as to cause said roller to force the mesh into the bottom layer simultaneously with the operation of forming said layer.

It is preferable, however, to introduce the wire mesh in the manner shown in full lines in said figure.

Having thus described my invention, what I claim as new and desire to secure by Letters Patent is:

1. The method of making wire glass which consists in forming two layers of glass and arranging a piece of wire mesh between them, and thereafter covering one of said layers with a finishing layer of glass; substantially as described.

2. The method of making wire glass which consists in forming a sheet of glass from two layers of glass and a piece of wire mesh interposed between same, and thereafter covering one surface of said sheet with a finishing layer of glass; substantially as described.

3. The method of making wire glass which consists in forming a layer of glass, spreading a mass of molten glass over said layer to form a second layer and simultaneously incorporating a piece of wire mesh in said second layer, and thereafter covering the top surface of said layer with a finishing layer of glass; substantially as described.

4. The method of making wire glass which consists in forming a layer of glass, progressively arranging a piece of wire mesh on the top face of said layer and spreading a mass of molten glass over same to form a second layer, and thereafter covering the top face of said second layer with a third layer of glass; substantially as described.

5. The method of making wire glass which consists in forming a layer of glass, dumping a mass of molten glass onto said layer, spreading a portion of said mass over the first layer to form a second layer, spreading the remaining portion of said mass over the second layer to form a third layer, and interposing a piece of wire mesh between two of said layers; substantially as described.

6. The method of making a sheet of wire glass which consists in forming a layer of glass, progressively arranging a piece of wire mesh on the top face of said layer and spreading a portion of a mass of molten glass thereover to form a second layer, and thereafter spreading the remaining portion of said mass of molten glass over the second layer to form a finishing layer; substantially as described.

7. The method of making a sheet of wire glass which consists in rolling a mass of molten glass into layer form, rolling a portion of a mass of molten glass over the top surface thereof to form a second layer and simultaneously incorporating a piece of wire mesh in said second layer, and thereafter rolling the remaining portion of said mass in the reverse direction over the top surface of the second layer to form a finishing layer; substantially as described.

8. An apparatus for forming a sheet of wire glass comprising means for forming a layer of glass, and means for spreading a portion of a mass of molten glass over the top face thereof to form a second layer and simultaneously incorporate a piece of wire mesh therein, and thereafter spread the remaining portion of said mass over the top face of the second layer to form a finishing layer; substantially as described.

9. An apparatus for forming a sheet of wire glass comprising means for forming a layer of glass, and means for progressively spreading a portion of a mass of molten glass over the top face of said layer to form a second layer and arrange a piece of wire mesh between said layers, and thereafter spread the remaining portion of said mass in the opposite direction over the top face of the second layer to form a finishing layer; substantially as described.

10. The method of making wire glass which consists in forming a sheet of glass from one pour, progressively arranging a piece of wire mesh on the top face of said sheet and then superimposing thereon a plurality of layers from another pour.

In testimony whereof I hereunto affix my signature in the presence of two witnesses, this twenty-sixth day of November 1907.

ROBERT A. B. WALSH.

Witnesses:
F. R. CORNWALL,
GEORGE BAKEWELL.